(12) United States Patent
Tu (10) Patent No.: US 7,726,650 B2
(45) Date of Patent: Jun. 1, 2010

(54) AUTOMATIC DOCUMENT FEEDER HAVING MECHANISM FOR RELEASING PAPER JAM

(75) Inventor: Tung-Wen Tu, Taipei (TW)

(73) Assignee: Primax Electroncs Ltd., Taipei (TW)

( * ) Notice: Subject to any disclaimer, the term of this patent is extended or adjusted under 35 U.S.C. 154(b) by 139 days.

(21) Appl. No.: 11/754,159

(22) Filed: May 25, 2007

(65) Prior Publication Data

US 2008/0191412 A1    Aug. 14, 2008

(30) Foreign Application Priority Data

Feb. 9, 2007    (TW) .............................. 96104714 A (51) Int. Cl.
*B65H 5/06*    (2006.01)
(52) U.S. Cl. .................. 271/274; 271/273; 399/124; 399/125
(58) Field of Classification Search ........... 271/273, 271/274; 399/124, 125
See application file for complete search history.

(56) References Cited

U.S. PATENT DOCUMENTS

| | | | |
|---|---|---|---|
| 3,633,027 A | | 1/1972 | Rhyage |
| 4,542,293 A | | 9/1985 | Fenn |
| 4,546,253 A | | 10/1985 | Tsuchiya |
| 4,654,052 A | | 3/1987 | Sharp |
| 4,861,988 A | | 8/1989 | Henion |
| 5,033,891 A | * | 7/1991 | Kitazume et al. ........... 400/624 |
| 5,098,210 A | * | 3/1992 | Fujisawa et al. ............ 400/624 |
| 5,137,553 A | | 8/1992 | Dawes |
| 5,150,630 A | * | 9/1992 | Kida et al. ................. 74/354 |
| 5,192,865 A | | 3/1993 | Zhu |
| 5,306,412 A | | 4/1994 | Whitehouse |
| 5,352,892 A | | 10/1994 | Mordehai |
| 5,412,208 A | | 5/1995 | Covey |
| 5,484,140 A | * | 1/1996 | Hirose et al. ............... 271/175 |
| 5,684,300 A | | 11/1997 | Taylor |
| 5,788,166 A | | 8/1998 | Valaskovic |
| 5,997,746 A | | 12/1999 | Valaskovic |

(Continued)

OTHER PUBLICATIONS

Barber, M. et al., "Fast atom bombardment of solids (F.A.B.): a new ion source for mass spectrometry" J.Chem. Soc. Chem. Commun., 1981, 325.

(Continued)

*Primary Examiner*—Patrick Mackey
*Assistant Examiner*—Ernesto Suarez
(74) *Attorney, Agent, or Firm*—Apex Juris, pllc; Tracy M Heims (57) ABSTRACT

The present invention relates to an automatic document feeder having a mechanism for releasing paper jam by disconnecting the transmission device. The automatic document feeder includes a driving motor, a transmission device, a plurality of paper transfer rollers, a swing arm and a releasing arm. The driving motor is used for providing driving power. The transmission device and is coupled to the driving motor for transmitting the driving power. The swing arm is coupled to some of the transmission elements and operated in either a connection state or a disconnection state. The releasing arm is selectively contacted with the swing arm to have the swing arm enter the disconnection state or separated from the swing arm to have the swing arm enter the connection state. The paper jam is released when the swing arm is operated in the disconnection state.

6 Claims, 7 Drawing Sheets

U.S. PATENT DOCUMENTS

| | | |
|---|---|---|
| 6,107,628 A | 8/2000 | Smith |
| 6,124,675 A | 9/2000 | Bertrand |
| 6,190,559 B1 | 2/2001 | Valaskovic |
| 6,225,623 B1 | 5/2001 | Turner |
| 6,395,183 B1 | 5/2002 | Valaskovic |
| 6,583,408 B2 | 6/2003 | Smith |
| 6,649,907 B2 | 11/2003 | Ebeling |
| 6,690,006 B2 | 2/2004 | Valaskovic |
| 6,723,985 B2 | 4/2004 | Schultz |
| 6,744,041 B2 | 6/2004 | Sheehan |
| 6,744,046 B2 | 6/2004 | Valaskovic |
| 6,784,424 B1 | 8/2004 | Willoughby |
| 6,803,565 B2 | 10/2004 | Smith |
| 6,806,468 B2 | 10/2004 | Laiko |
| 6,818,889 B1 | 11/2004 | Sheehan |
| 6,861,647 B2 | 3/2005 | Reilly |
| 6,878,930 B1 | 4/2005 | Willoughby |
| 6,888,132 B1 | 5/2005 | Sheehan |
| 6,914,243 B2 | 7/2005 | Sheehan |
| 6,943,347 B1 | 9/2005 | Willoughby |
| 6,949,739 B2 | 9/2005 | Franzen |
| 6,949,740 B1 | 9/2005 | Sheehan |
| 6,949,741 B2 | 9/2005 | Cody |
| 6,956,205 B2 | 10/2005 | Park |
| 6,977,372 B2 | 12/2005 | Valaskovic |
| 6,979,816 B2 | 12/2005 | Takats |
| 6,992,299 B2 | 1/2006 | Lee |
| 7,064,317 B2 | 6/2006 | MCluckey |
| 7,081,618 B2 | 7/2006 | Laprade |
| 7,081,621 B1 | 7/2006 | Willoughby |
| 7,095,019 B1 | 8/2006 | Sheehan |
| 7,112,785 B2 | 9/2006 | Laramee |
| 7,138,626 B1 | 11/2006 | Karpetsky |
| 7,272,340 B2 * | 9/2007 | Song .................. 399/111 |
| 2002/0185593 A1 | 12/2002 | Doring |
| 2003/0052268 A1 | 3/2003 | Doroshenko |
| 2004/0159784 A1 | 8/2004 | Doroshenko |
| 2005/0029442 A1 | 2/2005 | Takats |
| 2005/0079631 A1 | 4/2005 | Laiko |
| 2005/0230635 A1 | 10/2005 | Takats |
| 2006/0071665 A1 | 4/2006 | Blake |
| 2006/0079002 A1 | 4/2006 | Gologan |
| 2006/0097157 A1 | 5/2006 | Ouyang |
| 2006/0163468 A1 | 7/2006 | Wells |
| 2006/0266941 A1 | 11/2006 | Vestal |
| 2007/0114389 A1 | 5/2007 | Karpetsky |
| 2007/0187589 A1 | 8/2007 | Cooks |

OTHER PUBLICATIONS

Cody, R.B. et al., "Versatile New Ion Source for the Analysis of Materials in Open Air under Ambient Conditions" Anal. Chem., 2005, 77, 2297-2302.

Cooks, R.G. et al., "Ambient Mass Spectrometry", Science, 2006, 311, 1566-1570.

Dalton, C.N. et al., "Electrospray-Atmospheric Sampling Glow Discharge Ionization Source for the Direct Analysis of Liquid Samples", Analytical Chemistry, Apr. 1, 2003, vol. 75, No. 7, pp. 1620-1627.

Fenn et al., "Electrospray Ionization for Mass Spectrometry of Large Biomolecules," Science, vol. 246, No. 4926, Oct. 6, 1989, pp. 64-71.

Guzowski, J.P. Jr. et al., "Development of a Direct Current Gas Sampling Glow Discharge Ionization Source for the Time-of-Flight Mass Spectrometer", J. Anal. At. Spectrom., 14, 1999, pp. 1121-1127.

Hill, C.A. et al., "A pulsed corona discharge switchable high resolution ion mobility spectrometer-mass spectrometer", Analyst, 2003, 128, pp. 55-60.

Hiraoka, K. et al., "Atmospheric-Pressure Penning Ionization Mass Spectrometry", Rapid Commun. Mass Spectrom., 18, 2004, pp. 2323-2330.

Karas, M. et al., "Laser desorption ionization of proteins with molecular masses exceeding 10,000 daltons" Anal. Chem. 1988, 60, 2299-2301.

Kojiro, D.R. et al., "Determination of $C_1$-$C_4$ Alkanes by Ion Mobility Spectrometry", Anal. Chem., 63, 1991, pp. 2295-2300.

Leymarie, N. et al., "Negative Ion Generation Using a MAB Source", presented at the Annual Meeting of the American Society of Mass Spectrometry, 2000.

McLuckey, S.A. et al., "Atmospheric Sampling Glow Discharge Ionization Source for the Determination of Trace Organic Compounds in Ambient Air", Anal. Chem., 60, 1988, pp. 2220-2227.

Otsuka, K. et al., "An Interface for Liquid Chromatograph/Liquid Ionization Mass Spectrometer", Analytical Sciences, Oct. 1988, vol. 4, pp. 467-472.

Tanaka, K. et al., "Protein and polymer analyses up to m/z 100,000 by laser ionization time-of-flight", Rapid Commun. Mass Spectrom., 1988, 2, 151-153.

Takáts et al., "Mass Spectrometry Sampling Under Ambient Conditions with Desorption Electrospray Ionization,"Science, vol. 306, No. 5695, Oct. 15, 2004, pp. 471-473.

Zhao, J. et al., Liquid Sample Injection Using an Atmospheric Pressure Direct Current Glow Discharge Ionization Source, Analytical Chemistry, Jul. 1, 1992, vol. 64, No. 13, pp. 1426-1433.

\* cited by examiner

AUTOMATIC DOCUMENT FEEDER HAVING MECHANISM FOR RELEASING PAPER JAM

FIELD OF THE INVENTION

The present invention relates to an automatic document feeder, and more particularly to an automatic document feeder having a mechanism for releasing paper jam.

BACKGROUND OF THE INVENTION

Image scanning apparatuses such as image scanners, copiers, printers and multi function peripherals (MFPs) are widely used in daily lives or offices for scanning images of objects such as paper sheets. As known, the image scanning apparatus usually has an automatic document feeder for automatically and continuously feeding many paper sheets one by one. During operation of the automatic document feeder, the paper sheet is readily jammed. For example, the paper sheets that are too thick or too thin may cause jams. In addition, if the paper sheet is too wet or too dry such that the paper sheet may be softened or hardened, or if the smoothness or length of the paper sheet is improper, the paper sheet is transported across the feeding path with difficulty. Moreover, if the paper feeding operation is abruptly interrupted, the possibility of getting jammed paper sheet is increased. Conventionally, the automatic document feeder has a paper release mechanism for removing the jammed paper sheet.

Figure 1:
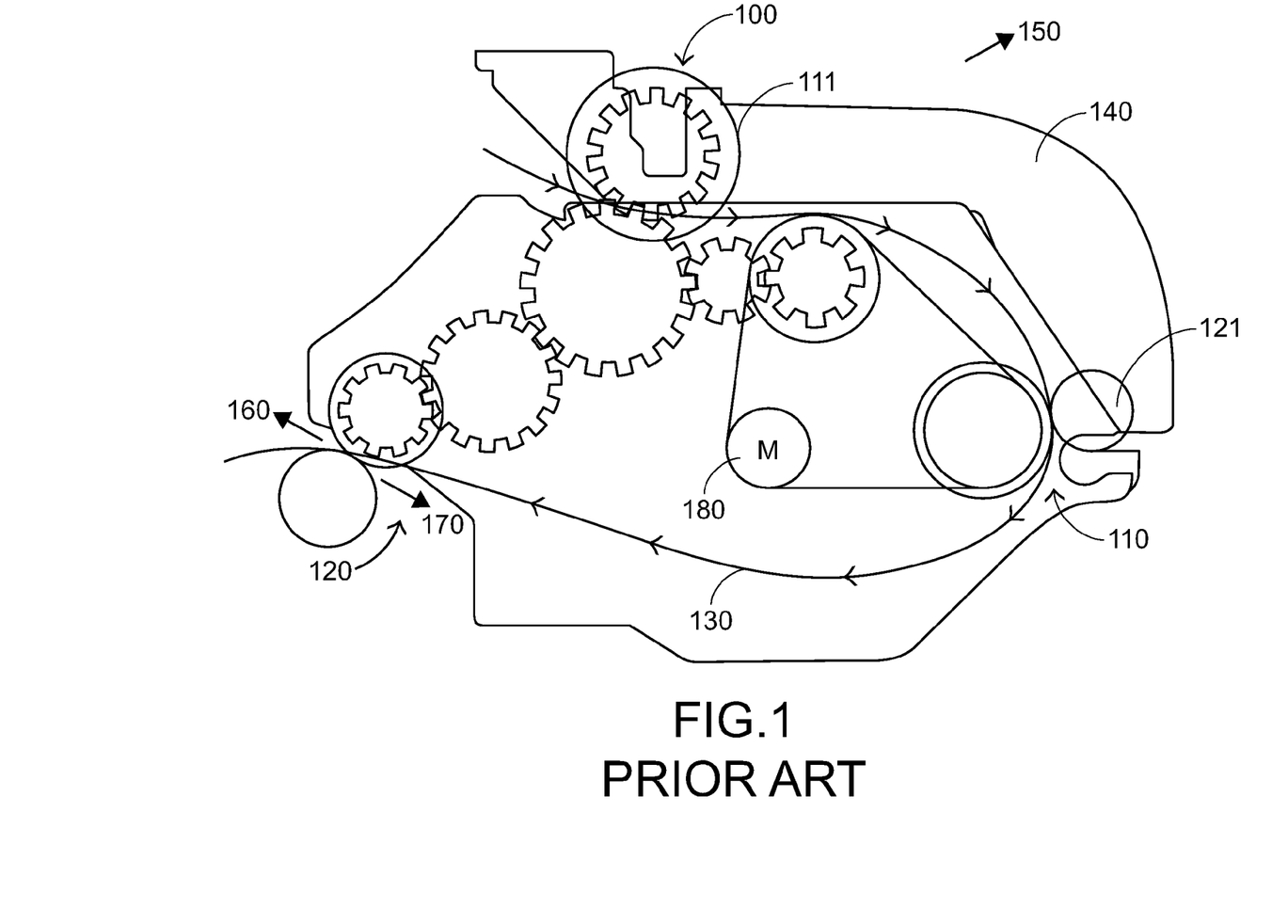
FIG. 1 is a schematic cross-sectional view of a conventional automatic document feeder having a mechanism for releasing paper jam.

Referring to FIG. 1, a schematic cross-sectional view of an automatic document feeder having a mechanism for releasing paper jam is illustrated. The automatic document feeder includes a first transfer roller assembly 100, a second transfer roller assembly 110 and a third transfer roller assembly 120. During operation of the automatic document feeder, the paper sheet is moved along the feeding path 130 and successively transported across the first transfer roller assembly 110, the second transfer roller assembly 110 and the third transfer roller assembly 120.

The first transfer roller assembly 100 and the second transfer roller assembly 110 are coupled to the upper cover 140 of the automatic document feeder. A first transfer follower roller 111 of the first transfer roller assembly 100 and a second transfer follower roller 121 of the second transfer roller assembly 110 are both coupled to the upper cover 140. In a case that the paper sheet is jammed in the vicinity of the first transfer roller assembly 100 or the second transfer roller assembly 110, the user may uplift the upper cover 140 in the direction as indicated by the arrow 150 to release the first transfer roller assembly 100 and the second transfer roller assembly 110 while easily pulling out the jammed paper.

In contrast, if the paper sheet is jammed in the vicinity of the third transfer roller assembly 120, the user needs to pull out the jammed paper in the direction as indicated by the arrow 160 or 170 by exerting a pulling force. Since the pulling force needs to be large enough to pull out the jammed paper, the paper sheet may be fractured or broken in the feeding path 130 of the automatic document feeder.

Please refer to FIG. 1 again. A transmission mechanism is arranged between the third transfer roller assembly 120 and a motor 180. The transmission mechanism includes a plurality of gears. These gears are engaged with each other. During the process of pulling out the paper sheet jammed in the third transfer roller assembly 120, the motor 180 may generate a damping-reinforced effect and thus the resistive force is increased. That is why the paper sheet jammed in the third transfer roller assembly 120 is pulled out with difficulty.

In views of the above-described disadvantages resulted from the prior art, the applicant keeps on carving unflaggingly to develop an automatic document feeder having a mechanism for releasing paper jam in order to minimize the damping-reinforced effect and facilitate easily releasing the jammed paper.

SUMMARY OF THE INVENTION

It is an object of the present invention to provide an automatic document feeder having a mechanism for releasing paper jam in order to minimize the damping-reinforced effect and facilitate easily releasing the jammed paper.

Another object of the present invention provides an automatic document feeder having a mechanism for releasing paper jam by disconnecting the transmission device to interrupt indirect connection between the paper transfer roller and the driving motor, thereby facilitating easily releasing the jammed paper.

In accordance with an aspect of the present invention, there is provided an automatic document feeder having a mechanism for releasing paper jam. The automatic document feeder includes a driving motor, a transmission device, a plurality of paper transfer rollers, a swing arm and a releasing arm. The driving motor is used for providing driving power. The transmission device includes a plurality of transmission elements, and is coupled to the driving motor for transmitting the driving power. The paper transfer rollers are coupled to the transmission device for receiving the driving power to transport a paper sheet. The swing arm is coupled to some of the transmission elements and operated in either a connection state or a disconnection state. The releasing arm is selectively contacted with the swing arm to have the swing arm enter the disconnection state or separated from the swing arm to have the swing arm enter the connection state. The paper jam is released when the swing arm is operated in the disconnection state. The driving power provided by the driving motor is transmitted to the paper transfer rollers when the swing arm is operated in the connection state. The driving power provided by the driving motor fails to be transmitted to the paper transfer rollers when the swing arm is operated in the disconnection state.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the above described drawbacks resulting from the prior art, the present invention provides an improved automatic document feeder having a mechanism for releasing paper jam. By using a swing arm and a releasing arm to disconnect the transmission device, the driving power of the driving motor fails to be transmitted to the paper transfer roller, so that the user may remove the paper sheet jammed in the inner roller assembly without difficulty.

Figure 2:
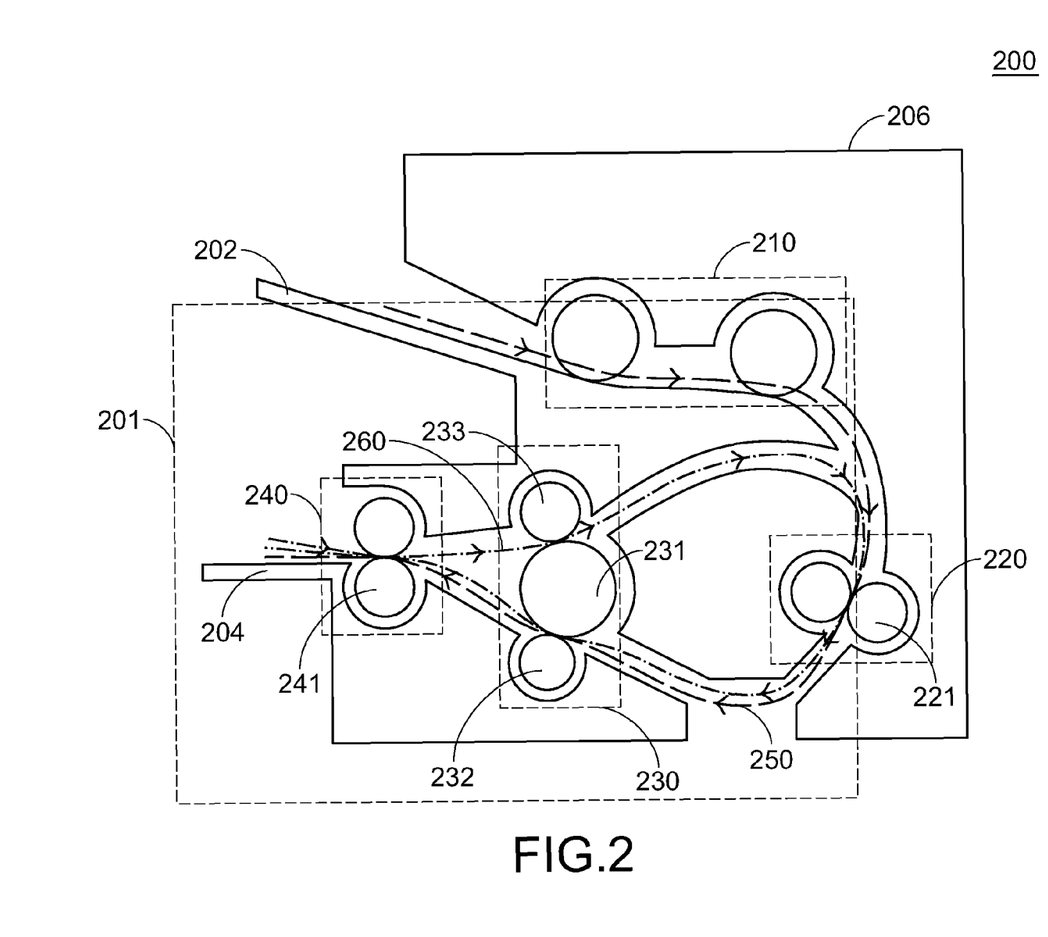
FIG. 2 is a schematic cross-sectional view of an automatic document feeder according to a preferred embodiment of the present invention.

Referring to FIG. 2, a schematic cross-sectional view of an automatic document feeder according to a preferred embodiment of the present invention is illustrated. Recently, a duplex scanning apparatus is widely used in offices for scanning operation to scan both sides of the paper sheet. For illustration, the automatic document feeder of FIG. 2 is a duplex automatic document feeder for use with a duplex scanning apparatus. The automatic document feeder of FIG. 2 principally comprises a main body 201 and an upper cover 206. The main body 201 includes a paper input tray 202, a paper ejecting tray 204, an inner roller assembly 230, an ejecting roller assembly 240, a first transfer path 250 and a second transfer path 260. The inner roller assembly 230 includes a first paper transfer roller 231, a second paper transfer roller 232 and a third paper transfer roller 233. The ejecting roller assembly 240 includes a driving roller 241. A pick-up roller assembly 210 and a transfer roller assembly 220 are coupled to the upper cover 206. The transfer roller assembly 220 includes a transfer driving roller 221.

Hereinafter, a procedure of performing a duplex scanning operation on a paper sheet is illustrated. First of all, the paper sheet to be scanned is placed in the sheet input tray 202. By the pick-up roller assembly 210, the paper sheet is transported into the first transfer path 250. Then, the paper sheet is successively transported across the transfer roller assembly 220, the inner roller assembly 230 and the ejecting roller assembly 240. When the paper sheet 306 is transported across a scan region (not shown) in the first transfer path 250, a first side of the paper sheet is scanned by a scanning module (not shown) under the scan region. Next, the driving roller 241 of the ejecting roller assembly 240 is rotated in an anti-clockwise direction to eject the paper sheet. After the first side of the paper sheet is scanned and a majority of the paper sheet is ejected to the paper ejecting tray 204, the driving roller 241 of the ejecting roller assembly 240 is reversely rotated in the clockwise direction, so that the paper sheet is transported into the second transfer path 260. Next, the paper sheet is successively transported across the transfer roller assembly 220, the inner roller assembly 230 and the ejecting roller assembly 240. When the paper sheet is transported across the scan region, a second side of the paper sheet is scanned by the scanning module. Next, the driving roller 241 of the ejecting roller assembly 240 is rotated in the anti-clockwise direction to have the paper sheet eject to the paper ejecting tray 204.

It is noted that, however, those skilled in the art will readily observe that numerous modifications and alterations of the duplex scanning operation may be made while retaining the teachings of the invention. The details of the duplex scanning operation are not redundantly described herein. For example, the mechanism for releasing the paper sheet jammed in the pick-up roller assembly 210 or the transfer roller assembly 220 is identical to that shown in FIG. 1, and is not redundantly described herein. In a case that the paper sheet is jammed in the vicinity of the pick-up roller assembly 210 or the transfer roller assembly 220, the user may uplift the upper cover 206 to easily release the jammed paper.

Figure 3:
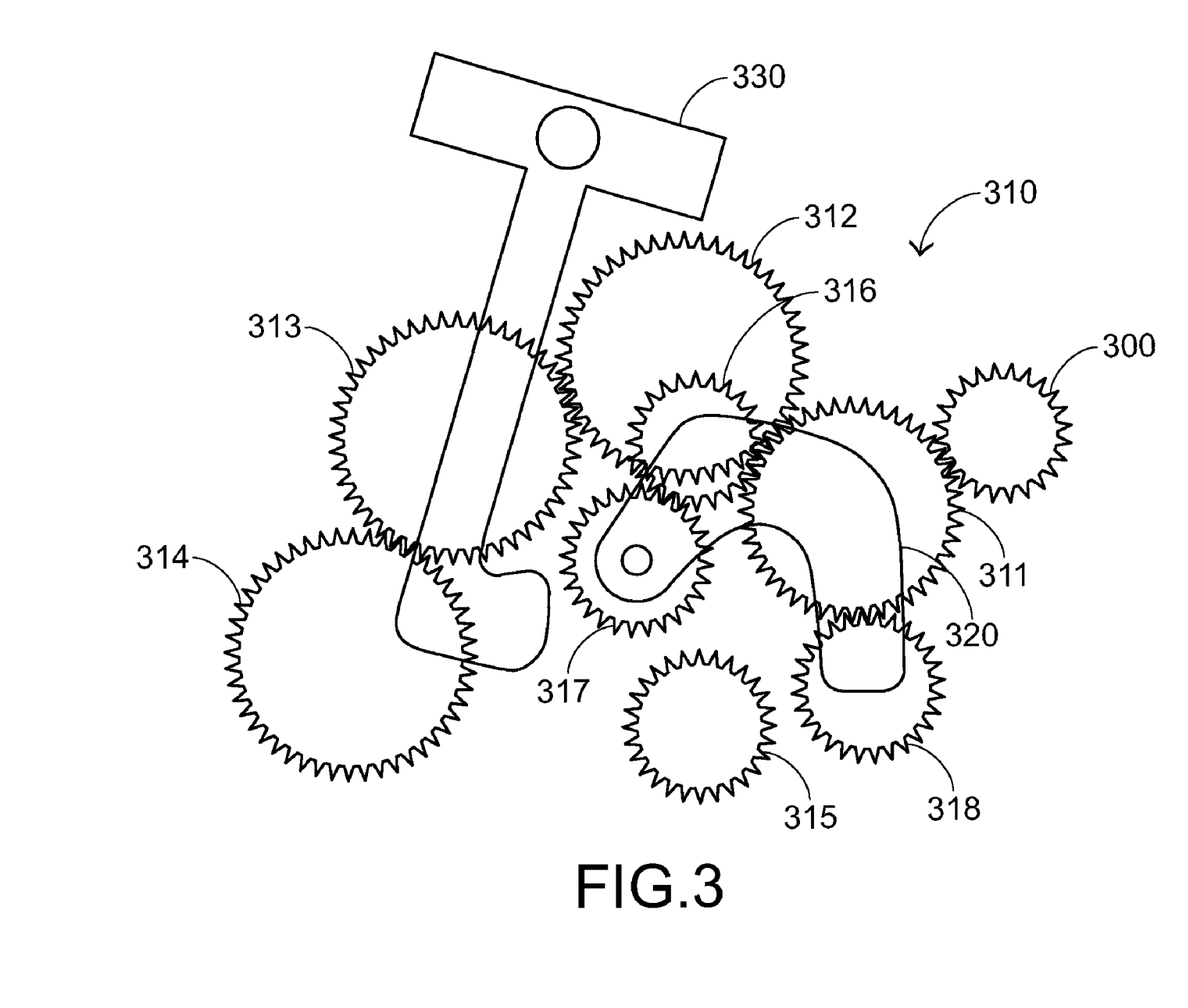
FIG. 3 is a schematic cross-sectional view illustrating partial inner components of the automatic document feeder shown in FIG. 2.

Please refer to FIG. 3, which is a schematic cross-sectional view illustrating partial inner components of the automatic document feeder shown in FIG. 2. The mechanism for releasing paper jam includes a driving motor 300, a transmission device 310, a swing arm 320 and a releasing arm 330. The transmission device 310 includes several transmission elements such as gears. In this embodiment, the transmission device 310 includes a first gear 311, a second gear 312, a third gear 313, a fourth gear 314, a fifth gear 315, a sixth gear 316, a seventh gear 317 and an eighth gear 318. The sixth gear 316, the seventh gear 317 and the eighth gear 318 are coupled to the swing arm 320. The fifth gear 315 is coaxial with the first paper transfer roller 231 of the inner roller assembly 230 (as shown in FIG. 2), so that the driving power provided by the driving motor 300 may be transmitted to the first paper transfer roller 231. Similarly, the fourth gear 314 is coaxial with the driving roller 241 of the ejecting roller assembly 240 (as shown in FIG. 2), so that the driving power provided by the driving motor 300 may be transmitted to the driving roller 241.

Figure 4:
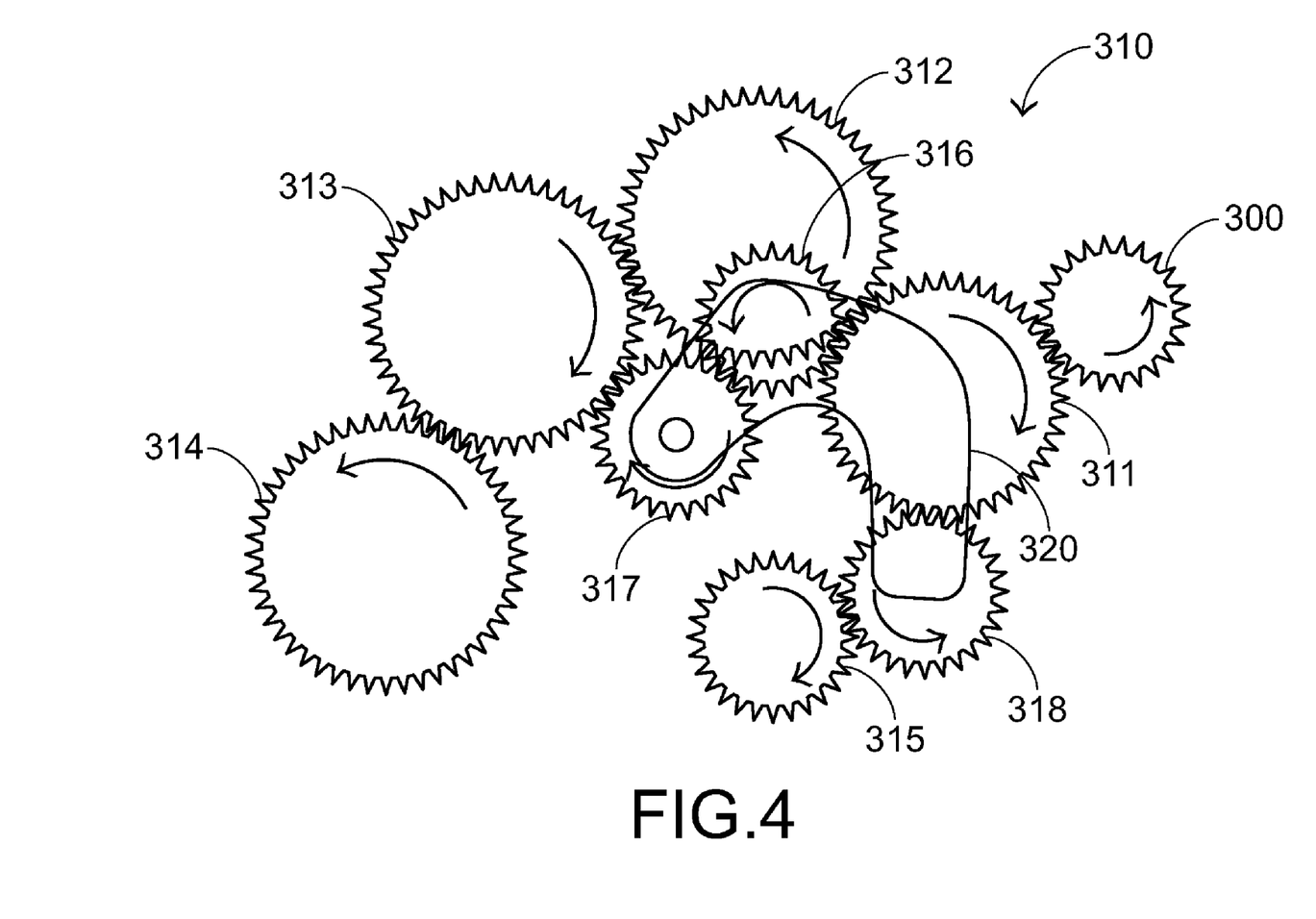
FIG. 4 is a schematic cross-sectional view illustrating an operation of the transmission device of the automatic document feeder.

Hereinafter, an operation of the transmission device is illustrated with reference to the schematic cross-sectional view of FIG. 4. After the paper sheet is fed into the first transfer path 250 (as shown in FIG. 2) or the second transfer path 260 (as shown in FIG. 2) and after the first or second side of the paper sheet is scanned, the driving motor 300 is rotated in the anti-clockwise direction. Correspondingly, the related gears 311~318 of the transmission device 310 are rotated in a clockwise or anti-clockwise direction as indicated by the arrows shown in the figure. Since the eighth gear 318 is coupled to the swing arm 320 and the first gear 311 is rotated in the clockwise direction, the eighth gear 318 has a tendency to approach the fifth gear 315. Once the eighth gear 318 is engaged with the fifth gear 315, the driving power of the driving motor 300 is transmitted to the fifth gear 315. Since the fifth gear 315 is coaxial with the first paper transfer roller 231 (as shown in FIG. 2), the first paper transfer roller 231 and the fifth gear 315 are synchronously rotated in the clockwise direction. In addition, since the fourth gear 314 is coaxial with the driving roller 241 (as shown in FIG. 2), the driving roller 241 and the fourth gear 314 are synchronously rotated in the anti-clockwise direction.

Figure 5:
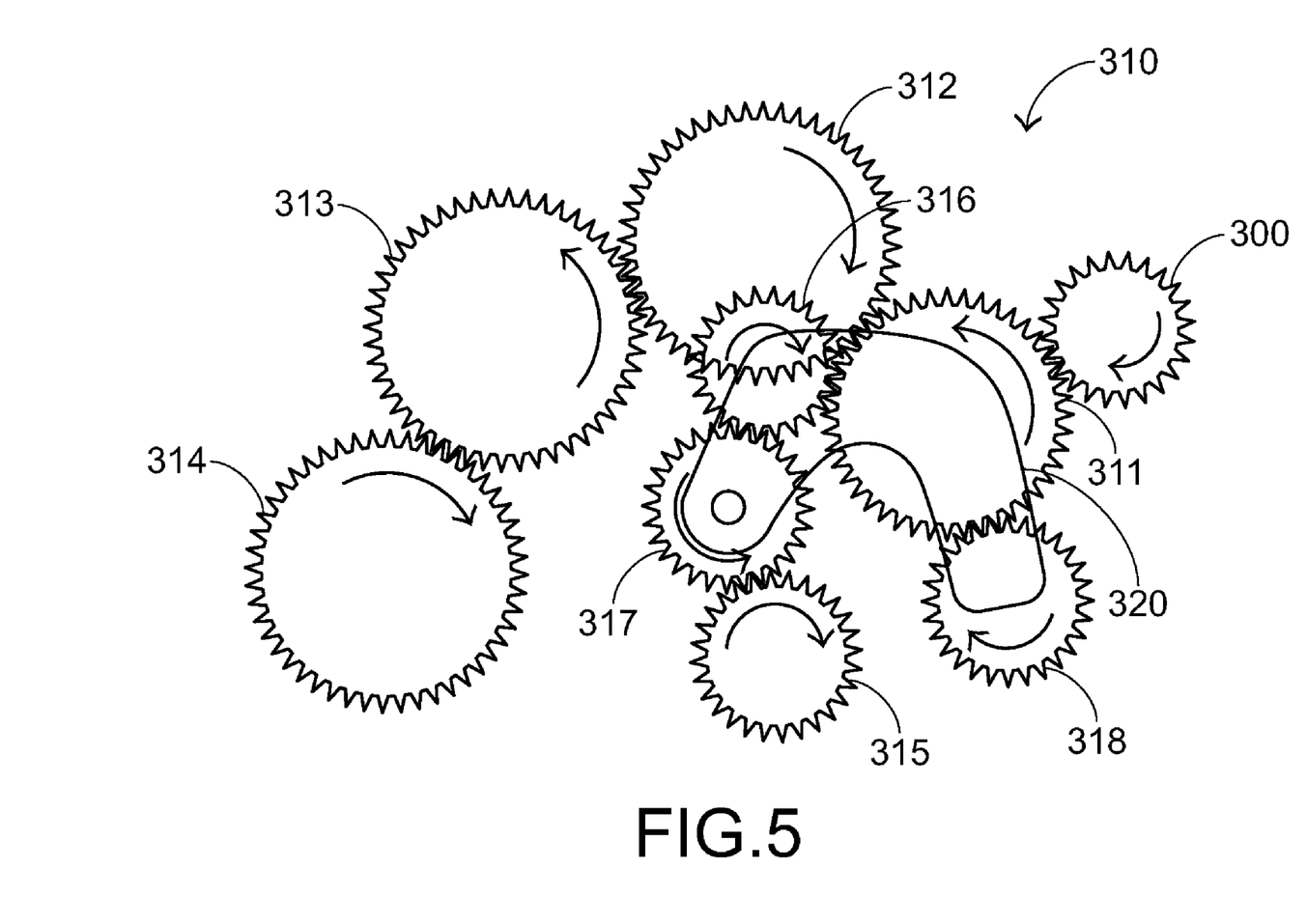
FIG. 5 is a schematic cross-sectional view illustrating another operation of the transmission device of the automatic document feeder.

Another operation of the transmission device is illustrated with reference to the schematic cross-sectional view of FIG. 5. In order to scan the second side of the paper sheet, after a majority of the paper sheet is transported across the ejecting roller assembly 240 (as shown in FIG. 2), the driving motor 300 is reversely rotated in the clockwise direction to feed the paper sheet into the second transfer path 260 (as shown in FIG. 2). Correspondingly, the related gears 311~318 of the transmission device 310 are rotated in a clockwise or anti-clockwise direction as indicated by the arrows shown in the figure. Since the sixth gear 316 is coupled to the swing arm 320 and the first gear 311 is rotated in the anti-clockwise direction, the sixth gear 316 and the seventh gear 317 have tendencies to approach the fifth gear 315. Once the seventh gear 317 is engaged with the fifth gear 315, the driving power of the driving motor 300 is transmitted to the fifth gear 315. Since the fifth gear 315 is coaxial with the first paper transfer roller 231 (as shown in FIG. 2), the first paper transfer roller 231 and the fifth gear 315 are synchronously rotated in the clockwise direction. In addition, since the fourth gear 314 is coaxial with the driving roller 241 (as shown in FIG. 2), the driving roller 241 and the fourth gear 314 are synchronously rotated in the clockwise direction.

Figure 6:
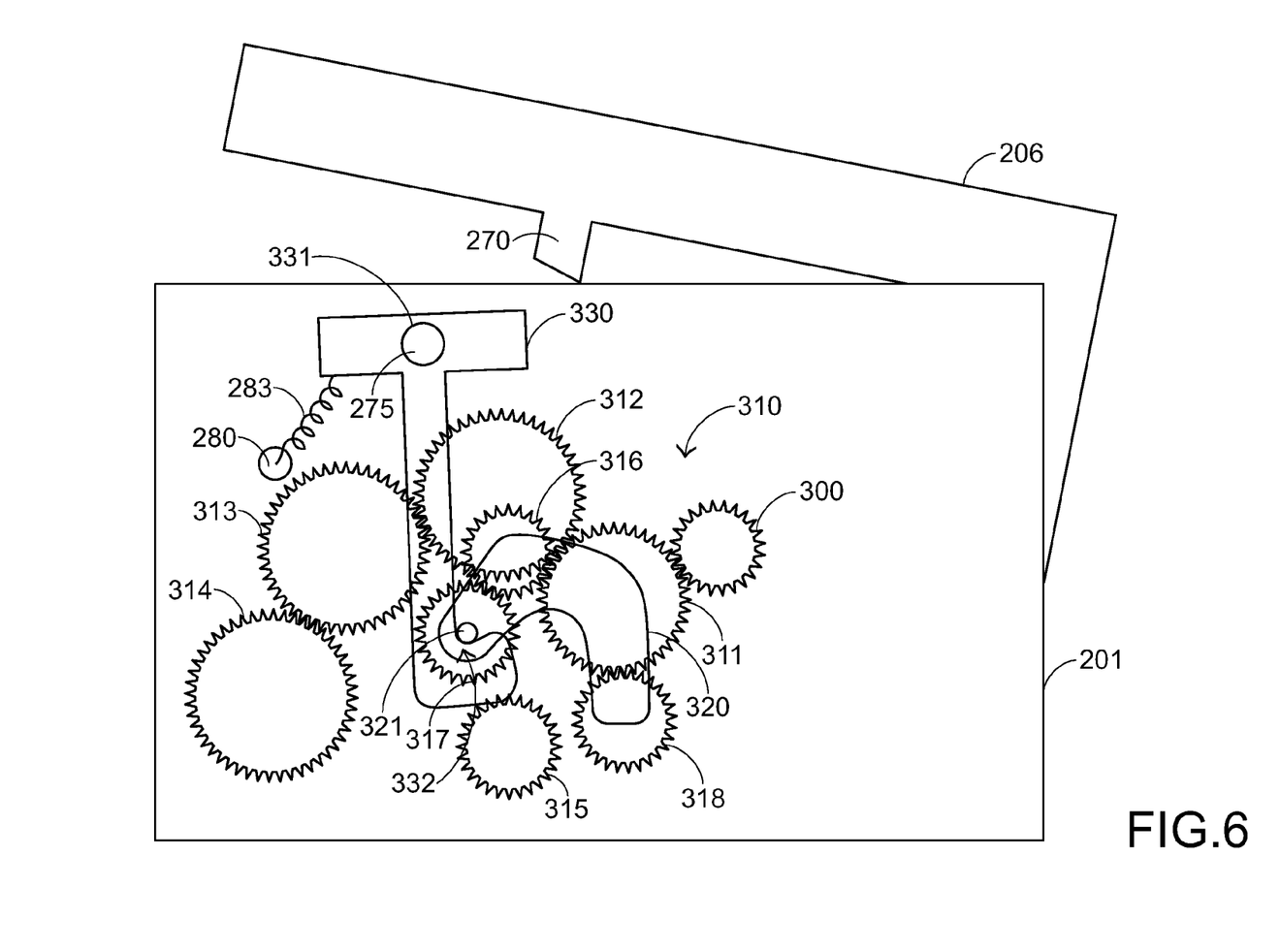
FIG. 6 is a schematic cross-sectional view illustrating a mechanism for releasing the paper jam by disconnecting the transmission device.

FIG. 6 is a schematic cross-sectional view illustrating a mechanism for releasing the paper jam by disconnecting the transmission device 310. For clearly illustrating the application of the releasing arm 330 to disconnect the transmission device 310 and release the jammed paper sheet, only the main body 201, the upper cover 206, the driving motor 300, the transmission device 310, the swing arm 320 and the releasing arm 330 are shown in FIG. 6. In addition, the upper cover 206 further includes a protrusion structure 270. The main body 201 includes a protruding shaft 275 and a first protruding button 280. The releasing arm 330 includes a pivotal hole 331 and a concave portion 332. The swing arm 320 includes a second protruding button 321. The releasing arm 330 is connected to the main body 201 via a resilient element 285 such as a spring. A first end of the spring 285 is coupled to the releasing arm 330; and a second end of the spring 285 is coupled to the first protruding button 280 of the main body 201. The pivotal hole 331 is sheathed around the protruding shaft 275 such that the releasing arm 330 is rotated with the protruding shaft 275.

Please refer to FIG. 6 and also FIG. 2. Generally, there are three possible situations that the paper sheet is jammed in the vicinity of the inner roller assembly 230 during the sheet feeding operation. For example, the paper sheet may be jammed between the first paper transfer roller 231 and the second paper transfer roller 232, between the first paper transfer roller 231 and the third paper transfer roller 233, or between the first paper transfer roller 231, the second paper transfer roller 232 and the third paper transfer roller 233. For releasing the jammed paper sheet, the upper cover 206 is uplifted. Due to the pulling force exerted by the spring 285, the releasing arm 330 is rotated with respect to the pivotal hole 331. Until the concave portion 332 of the releasing arm 330 is stopped and supported by the second protruding button 321, the swing arm 320 is fixed at a specified position. As a consequence, both of the seventh gear 317 and the eighth gear 318 fail to come into contact with the fifth gear 315. In this circumstance, the swing arm 320 is in a disconnect state because the fifth gear 315 is temporarily disconnected from the driving motor 300. When the swing arm 320 is in the disconnect state, the fifth gear 315 and the first paper transfer roller 231 are synchronously and freely rotated. At this moment, the user may remove the paper sheet jammed in the inner roller assembly 230 without difficulty.

Figure 7:
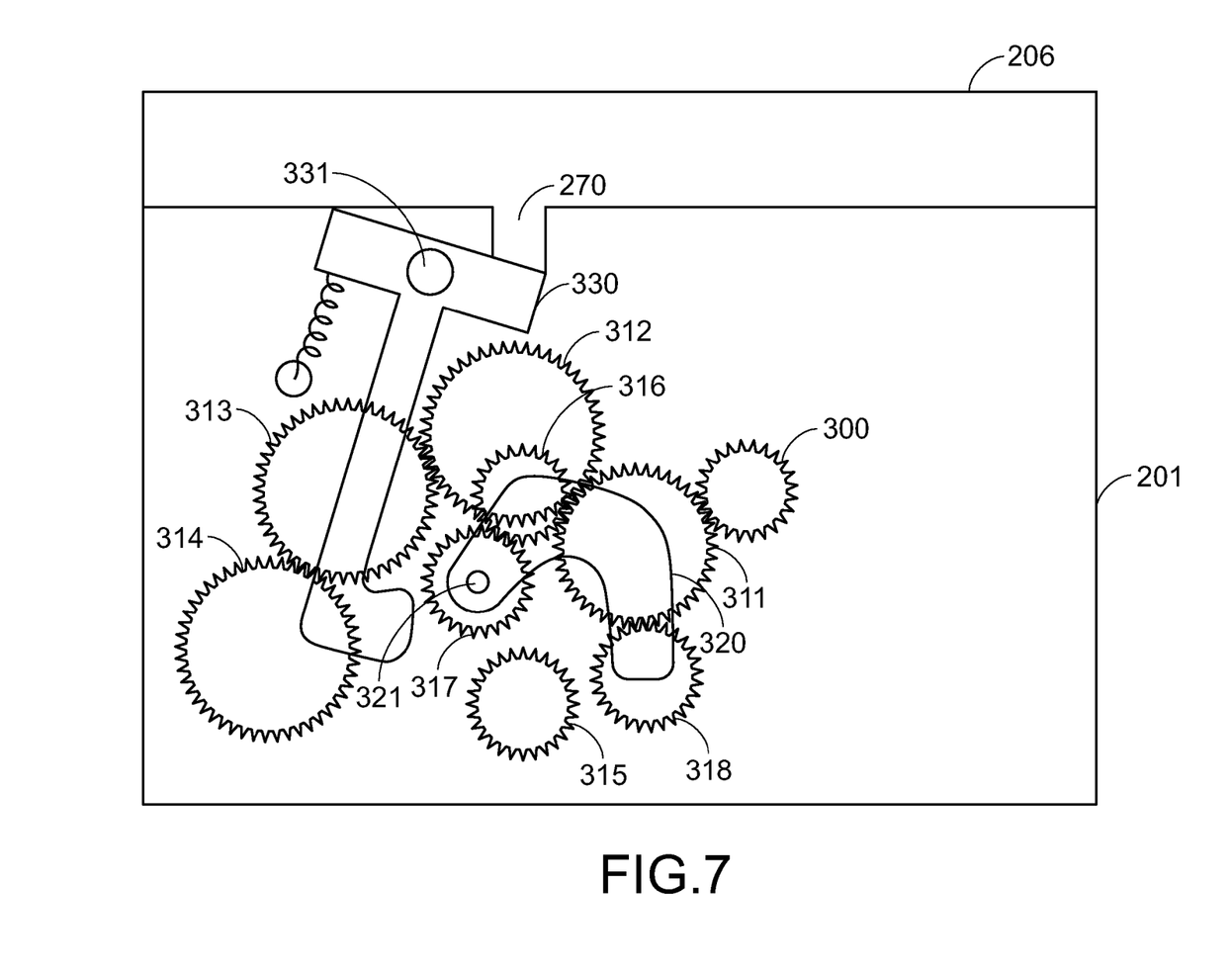
FIG. 7 is a schematic cross-sectional view illustrating reconnection of the transmission device.

FIG. 7 is a schematic cross-sectional view illustrating reconnection of the transmission device 310. Please refer to FIG. 7 and also FIG. 2. After the paper sheet jammed in the inner roller assembly 230 is removed, the upper cover 206 is laid over the main body 201 such that the protrusion structure 270 presses down the releasing arm 330. In response to the depressing force exerted by the protrusion structure 270, the releasing arm 330 is rotated with respect to the pivotal hole 331. As a result, the releasing arm 330 is separated from the second protruding button 321 and the swing arm 320 enters the connection state. Meanwhile, the fifth gear 315 is interacted with the driving motor 300 again. In a case that the driving motor 300 is rotated in the anti-clockwise direction, as described in FIG. 4, the eighth gear 318 is engaged with the fifth gear 315 so that the driving power of the driving motor 300 is transmitted to the fifth gear 315. In another case that the driving motor 300 is rotated in the clockwise direction, as described in FIG. 5, the seventh gear 317 is engaged with the fifth gear 315 so that the driving power of the driving motor 300 is transmitted to the fifth gear 315 and the transmission device 310 is reconnected.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic document feeder having a mechanism for releasing a paper jam, said automatic document feeder comprising:
   a main body;
   an upper cover pivotally connected to the main body and comprising a protrusion structure;
   a transfer roller assembly for transmitting paper;
   an inner roller assembly including a first paper transfer roller, a second paper transfer roller and a third paper transfer roller for receiving the paper transmitted from the transfer roller assembly and the first paper transfer roller is engaged with the second paper transfer roller and the third paper transfer roller;
   a driving motor for providing driving power;
   a transmission device coupled to said driving motor for transmitting said driving power to the roller assemblies including a sixth gear engaged with the driving motor, a fifth gear being coaxial with the first paper transfer roller, a seventh gear and an eighth gear;
   a swing arm connected to the sixth gear, the seventh gear and the eighth gear; and
   a releasing arm rotatably coupled to the main body;
   whereby when the upper cover is closed the releasing arm is depressed by the protrusion structure of the upper cover and the releasing arm is separated from the swing arm, and the fifth gear is engaged with the seventh gear or the eighth gear according to the rotational direction of the motor and,
   when the upper cover is opened, the releasing arm is rotated to engage the swing arm and the fifth gear is separated from the seventh gear and the eighth gear.

2. The automatic document feeder according to claim 1 wherein the transmission device includes a first gear and when the driving motor is rotated in an anti-clockwise direction, the first gear is rotated in a clockwise direction whereby the eighth gear is engaged with the fifth gear and the fifth gear is rotated in a clockwise direction, and when the driving motor is rotated in said clockwise direction, the first gear is rotated in said anti-clockwise direction whereby the seventh gear is engaged with the fifth gear and the fifth gear is rotated in said clockwise direction.

3. The automatic document feeder according to claim 2 wherein the main body includes a protruding shaft and a first protruding button.

4. The automatic document feeder according to claim 3 wherein the releasing arm includes a pivotal hole such that the releasing arm is rotated with the protruding shaft of the main body.

5. The automatic document feeder according to claim 4 wherein the swing arm includes a second protruding button whereby when the upper cover is opened, the concave portion of the releasing arm engages with the second protruding button of the swing arm, so that both of the seventh gear and the eighth gear fail to contact with the fifth gear.

6. The automatic document feeder according to claim 5 further including a resilient element for connecting the releasing arm and the first protruding button of the main body.

* * * * *